United States Patent [19]

Torpey

[11] 4,384,296

[45] May 17, 1983

[54] LINEAR INK JET DEFLECTION METHOD AND APPARATUS

[75] Inventor: Peter A. Torpey, Rochester, N.Y.

[73] Assignee: Xerox Corporation, Stamford, Conn.

[21] Appl. No.: 256,888

[22] Filed: Apr. 24, 1981

[51] Int. Cl.³ .............................................. G01D 15/18

[52] U.S. Cl. .................................. 346/75; 346/140 R

[58] Field of Search .............................. 346/75, 140 IJ

[56] References Cited

U.S. PATENT DOCUMENTS 4,123,760 10/1978 Hov ........................................ 346/75
4,240,081 12/1980 Devitt .................................... 346/75
4,274,100 6/1981 Pond ...................................... 346/75
4,281,331 7/1981 Shair ...................................... 346/75

*Primary Examiner*—George H. Miller, Jr.

[57] ABSTRACT

An ink jet method and apparatus including circuitry for controlling lateral deflection of an ink column before drops are formed. A deflection mechanism used to deflect the column comprises two electrode portions spaced on opposed sides of the column. By control of the voltages applied to the electrode portions the angle of ink column deflection is made proportional to a control voltage applied to the portions. This proportionality facilitates control over column scanning to insure proper ink drop placement on the ink jet recording medium.

3 Claims, 8 Drawing Figures

LINEAR INK JET DEFLECTION METHOD AND APPARATUS

BACKGROUND OF THE INVENTION

1. Field of the Invention

This invention relates to ink jet technology, and more particularly to method and apparatus for controlling the trajectory of a continuous stream of ink emitted from an orifice prior to ink drop production.

2. Prior Art

In one form of ink jet printing, conductive fluid is delivered under pressure from a cavity through an orifice in the form of a continuous stream. Perturbation is applied to the ink in the cavity, such as for example, by periodic excitation of a piezoelectric crystal mounted within the cavity. This excitation causes the continuous stream flowing through the orifice to break up into substantially uniform drops which are uniformly spaced from one another. At the point of drop formation, drop charge electrodes coupled to control circuitry for applying specific voltages induce a charge upon the drops. Selective deflection of the drops is then achieved by passing them through an electric field created by deflection electrodes having a voltage sufficient to cause an appreciable drop deflection. The electric field generated by the electrodes selectively deflects the charged drop to a predetermined position on a recording medium or to a gutter which is coupled to the cavity and is utilized to recycle those ink droplets not directed to the recording medium.

A number of ink jet geometries have been proposed to encode information on a record medium such as a sheet of paper. In a typical ink jet configuration ink droplets are selectively transmitted to the sheet of paper a row at a time and the sheet is moved in relation to the ink jet generator so that subsequent rows may be encoded with information. The longitudinal movement between paper and ink jet generator may, for example, be achieved by mounting the paper to a rotating support drum which causes the paper to move past the generator.

According to one ink jet technique, a single ink jet nozzle sweeps or scans back and forth across the paper at a high rate of speed, depositing ink in both directions of the scan. A system embodying a single ink jet nozzle must include apparatus to accurately accelerate and decelerate that nozzle for each row of the scan. Use of a single ink jet nozzle places an upper limit on the speed with which the paper can be moved past the generator.

One proposed solution to the speed constraint imposed by the single ink jet geometry requires a 1:1 correspondence between the number of ink jet nozzles and the number of pixels or incremental areas of coverage across the width of paper. These multiple nozzles are stationary with respect to the paper and, therefore, require no controlled accelerations. A problem encountered with this ink jet geometry is the close spacing required to achieved a high resolution encoding of ink onto the paper. The ink jet charging and deflecting circuitry must also be closely spaced. This geometry becomes untenable for any system requiring high resolution.

The problems encountered with the single nozzle and 1:1 geometries discussed above have led to the proposal of an ink jet system having multiple ink jet nozzles which are spaced apart and thereby supply ink droplets to multiple pixels in a given scanning row. Choice of this intermediate geometry requires some mechanism or technique for providing complete coverage across a given row of pixels. One technique for providing this coverage is proposed in U.S. Pat. No. 3,689,693 to Cahill et al. entitled "Multiple Head Ink Drop Graphic Generator". Apparatus constructed in accordance with the '693 patent requires transverse or side to side scanning of the multiple ink jets so that each jet is responsible for sending ink droplets to a number of pixels in a given row. The vertical movement of the paper with respect to the ink jet nozzles may be intermittent or continuous. If the movement is intermittent, each ink jet sweeps across its entire segment of coverage before the paper is stepped to a new position. In a continuous motion system the paper is mounted to a rotating drum and each jet sweeps off a spiralling trajectory, moving sideways one pixel per drum revolution.

A somewhat different approach for a multiple jet spaced apart ink jet system is proposed in U.S. patent application Ser. No. 894,799 to Stephen F. Pond entitled "Electrostatic Scanning Ink Jet Method and Apparatus" which was filed in the U.S. Patent Office on Oct. 4, 1978, continuation application Ser. No. 84,010, now U.S. Pat. No. 4,274,100. The Pond application is incorporated herein by reference. The apparatus described in that application includes a series of spaced multiple ink jets which provide complete scanning coverage across a given row of pixels on the record medium without requiring side to side movement of the multiple ink jet nozzles. Each ink jet has associated with it a number of charging and deflection elements which interact with an ink drop to control its trajectory. Of particular note is the utilization of a control electrode or electrodes which repetitively cause a given ink jet to scan in a horizontal direction across a portion of a width of the record medium. Use of multiple ink jets provides coveage for an entire row. This ink deflection is provided prior to the breakup into individual drops and once break up does occur the drops are charged to an appropriate level, so that a deflection electrode can be used to controllably direct those drops either to the record member or to a gutter.

The apparatus disclosed in the Pond application represents a significant advance over the art. An entire row of pixels on the record member can be selectively encoded with information without moving the plurality of spaced ink jets in relation to the sheet of paper. Practice of the invention disclosed in the Pond application is not achieved without a certain degree of complexity. Care must be taken in applying control voltages to the electrodes to ensure that each of the multiple ink jets cover its designated region across the width of paper without overlapping its next closest neighbor and also without leaving gaps between areas of coverage. The process ensuring complete coverage across the width of the sheet of paper is known in the art as stitching.

The electrode configurations disclosed in the Pond application is non-linear in its response to control voltages applied to the electrode. The reason for this nonlinearity in response is due to the technique in which the ink jet column is deflected from side to side to scan across the paper. According to the preferred deflection technique disclosed in the Pond application, the ink comprises a conductive material which is charged by deflection electrodes positioned in close relation to the column prior to the break up of that column into droplets. The force exerted by a deflectional electrode on an incremental portion of the ink jet column is due primarily to coulomb interaction between the charge induced on the column and the electric field created by the voltage on the electrode. To a first approximation, this force is equal to the charge times the electrical field strength.

In the arrangement disclosed in the Pond application, both the charge on the ink jet column and the electric field generated by the electrode vary simultaneously as the ink jet is swept across the page. As a result, the force on the column is proportional to the square of the voltage and a non-linear deflection results in response to incremental changes in the voltage applied to the deflection electrode. This non-linear response makes more difficult the controlled direction of the ink jet droplets onto the record medium and also makes more difficult the stitching together of multiple ink jet sources to ensure complete coverage across a given row of pixels.

SUMMARY OF THE INVENTION

Practice of the present invention results in ink jet deflection capability presenting an improvement over prior art control techniques. Practice of the invention causes a substantially proportional relationship to exist between a deflection control voltage applied to a deflectional electrode and deflection experienced by the ink jet column. The proportionality in response results in more accurate placement of ink jet droplets on a record medium such as paper or the like and also facilitates the stitching together of multiple ink jets to completely cover the width of the medium.

Ink drop apparatus constructed in accordance with the invention includes a drop generator for generating at least one liquid column emitted from a nozzle under pressure for which liquid drops form at a break off region and fly toward a target or medium. A charging electrode is located at the drop break off region for inducing charge onto drops formed from the liquid column. The charged droplets are then deflected by a deflection mechanism which causes the droplets to either contact the medium or be collected by a gutter or the like. A scanning electrode is located adjacent the liquid column before droplet formation and causes the ink jet column to sweep across a portion of the record medium in response to applied voltages. This sweeping of the ink jet column is accomplished by coupling the electrode mechanism to a sweep circuit which applies voltages to the electrode which result in a column sweep angle proportional to the applied voltage and not the square of the applied voltage as was the case for prior ink jet sweep controls.

According to a preferred embodiment of the invention, the electrode mechanism includes two electrodes spaced on opposite sides of the ink jet column. The sweep circuitry includes means for biasing these two electrodes with first and second sweep voltages, respectively. Apparatus constructed in accordance with this embodiment of the invention causes the charge on the ink jet column to increase and decrease in proportion to the sweep voltage while maintaining the electric field in the region of the ink jet at a substantially constant magnitude. In this way only the charge varies with the sweep voltage and a proportionality is maintained between this voltage and the angle of sweep resulting from the interaction between the charge on the column and field between the electrodes.

A second embodiment of the invention includes a similar electrode arrangement coupled to circuitry which varies the voltage on the opposed electrodes in a slightly different manner. According to this embodiement the voltage on one electrode is increased while the voltage on a second electrode is proportionally decreased. Practice of this technique causes the electric field strength between electrodes to vary in proportion to the incremental change in potential on the electrodes while maintaining substantially constant charge on the conductive ink column. Again, it is seen that the deflection of the column resulting from this arrangement is proportional to the magnitude of the voltages applied to the oppositely positioned electrodes.

Practice of either embodiment in the invention facilitates the ink jet recording process. Since the angle of deflection for the ink column is proportional to the voltage applied to the control electrodes, a sweeping of the ink jet droplets across a given region of the record medium can be accomplished by application of a ramp-type voltage to the electrodes rather than the quadratic voltage signals required by the prior art. It should also be appreciated that the peak and valley voltages of this ramp voltage dictate the end points for the ink jet column and, therefore, greatly facilitate the stitching together of ink droplets from the multitude of ink jet nozzles across the page.

From the above it should be appreciated that one object of the present invention is to provide a simplified control technique for selectively sweeping an ink jet column across the width of the record medium by providing a linear response between a control voltage used to deflect the ink jet and the resulting sweep angle which occurs in response to the control voltage. Other objects and features of the present invention will become apparent when a description of a preferred embodiment of the invention is described in conjunction with the accompanying drawings.

DETAILED DESCRIPTION OF THE PREFERRED EMBODIMENT

Figure 1:
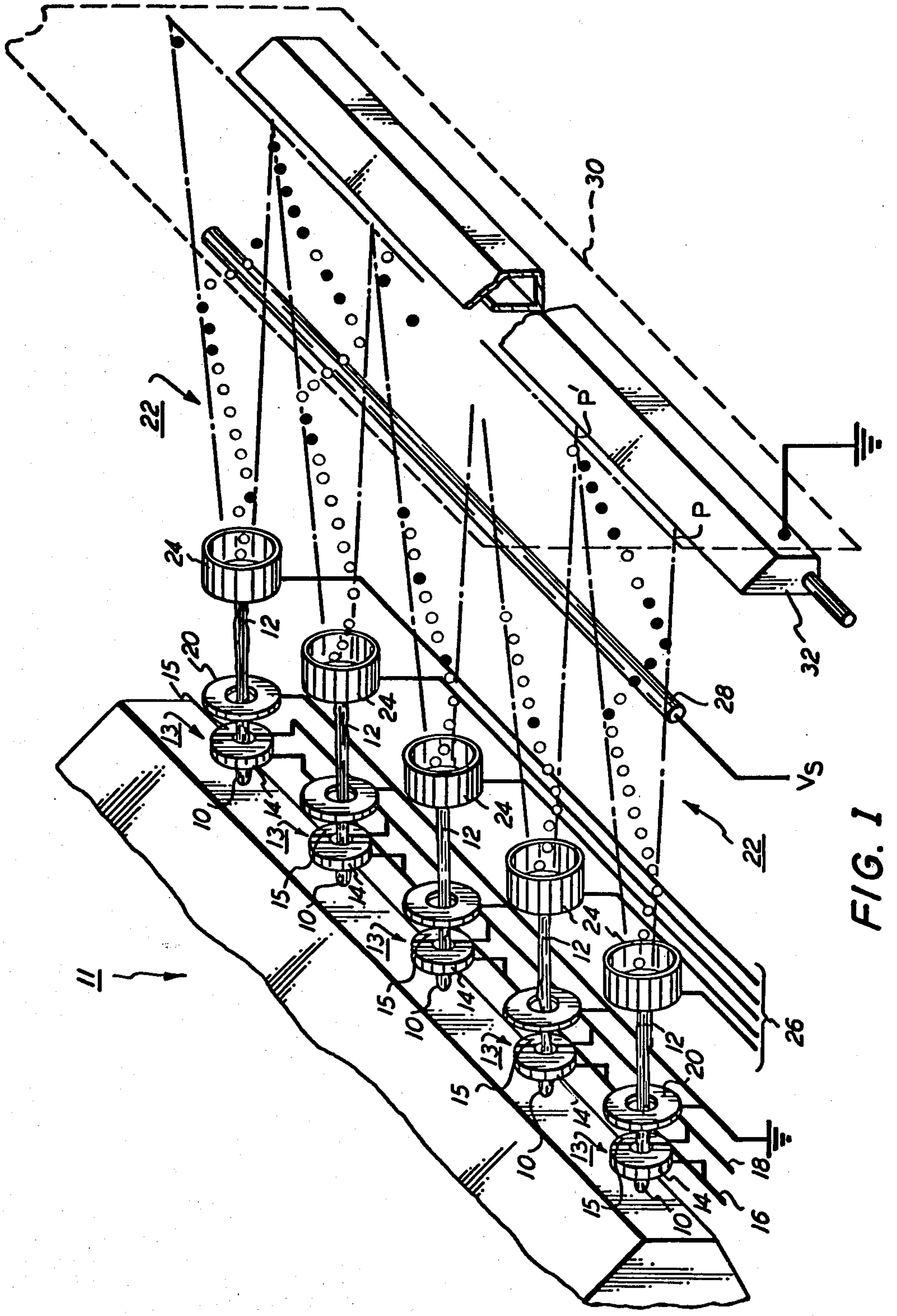
FIG. 1 is a perspective view showing a number of ink jets directing ink droplets to an imaging plane.

Referring now to FIG. 1, there is shown an ink jet array having improved performance due to practice of the present invention. Each jet comprises a nozzle 10 coupled to a drop generator 11 which includes a supply of ink under pressure. Emanating from each nozzle is a continuous electrically grounded stream 12 of ink which passes through a split ring electrode 13 comprising electrode elements 14 and 15. A time varying voltage constituting a scan signal is applied to these electrodes 14, 15 via leads 16, 18 thereby inducing a charge upon the continuous stream 12. The forces between the induced charge on the continuous stream 12 and the voltages at split ring electrode 13 cause the stream to be pulled toward either electrode 14 or electrode 15, depending upon the relative magnitudes of the voltages imposed on those electrodes 14 and 15, thus causing the continuous stream 12 to be laterally displaced in a direction substantially perpendicular to the axis of continuous stream 12. Subsequent to passing through split ring electrode 13,each stream 12 of ink passes through an optional ground shield 20 which is electrically grounded. The ink stream 12 then begins to break up into drops 22 due to perturbations generated by the drop generator 11. The ground shield 20 prevents the scan signal voltage from inducing charge upon these drops 22.

A drop charge electrode 24 having a lead 26 is located at the point of drop formation. The drop charge electrode 24 charges the drops 22 to an appropriate level so that selected ones can be deflected by a drop deflection electrode 28.

Due to the scanning motion imparted to continuous stream 12 by split ring electrode 13, continuous stream 12 is caused to scan between two end point positions P and P′. The spacing between ink jet nozzles 10 is such that the streams can be stitched together to cover the entire width of a printing plane 30 through control of the electrode voltages. A lateral distribution of drops intermediate the point of drop formation at drop charge electrode 24 and the printing plane 30 is shown in FIG. 1. Drops shown as solid are understood to be uncharged while the drops represented as circles are understood to be charged.

Drop deflection electrode 28 is electrically connected to a suitable voltage source $V_S$, to deflect charged drops as they travel toward the printing plane 30. As depicted in FIG. 1, drop deflection electrode 28 is located beneath the lateral distribution of the drops 22 and, since the drop deflection electrode can act only on charged drops the polarity of voltage source $V_S$ must be of opposite polarity to the charge on the charged drops thereby attracting them into a downward trajectory resulting in each charged drop landing in a gutter 32. It will be appreciated that drop deflection electrode 28 can be located above the lateral distribution of drops and, in that case, the polarity of voltage source $V_S$ is of the same polarity as that of charged drops in order to allow repulsion therebetween to achieve the downward deflection of charged drops into the gutter 32. Furthermore, it will be appreciated that gutter 32 can be located either above or below the lateral distribution of the drops 22. Accordingly, the voltage polarity of voltage source $V_S$ applied to the drop deflection electrode 28 must be chosen with the location of the drop deflection electrode 28 and the gutter 32 kept in mind.

The uncharged drops (solid drops in FIG. 1) are allowed to strike paper coincident with the printing plane 30 while the charged drops are deflected into the gutter. While this is preferred in order to minimize ink splatter contamination normally associated with charged drops being printed upon the paper, it will be appreciated that if desired the relationship between the gutter 32, drop deflection electrode 28 and print plane 30 can be arranged so that uncharged drops normally impact into the gutter 32 and charged drops are deflected into impact with print plane 30 of a receiving medium such as paper.

With regard to the time varying scan signal voltage applied to split ring electrode 13, the shape of the signal and electrode configuration is chosen to provide a lateral distribution of drops 22 proportional to the scan signal. In a raster scanning mode, wherein an even distribution of drops impacting the receiving medium in the print plane 30 is desired, a ramp voltage which attains a maximum level as a function of time and then drops back to its initial level is desirable. The ramp voltage will be discussed in detail in relation to FIGS. 5 and 6 below. In the event aberrations in lateral distribution occur due to fabrication or system design deficiencies, the appropriate portion of the scan signal voltage wave shape can be altered to correct for lateral drop distribution irregularities. As depicted in FIG. 1, the shape of the scan signal voltage wave form is chosen to provide a substantially even distribution of drops. A finite time is required for flyback of the control voltages so the drop charge electrode 24 is controlled to insure that all of the flyback drops are directed into the gutter 32.

Figure 2:
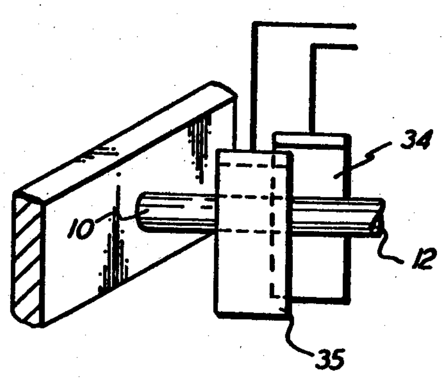
FIGS. 2–4 show alternate scan electrode designs for causing the FIG. 1 droplets to scan across the width of the imaging plane with each jet covering a portion of the width.
Figure 3:
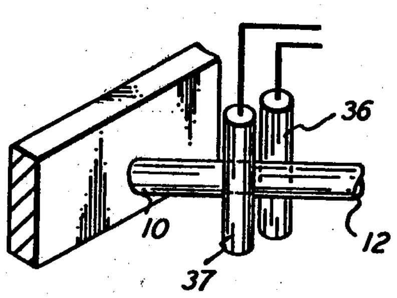
Figure 4:
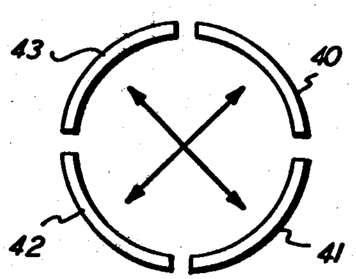

It will be appreciated that the geometry of drop charge electrode 24, ground shield 20 and electrode 13 need not be limited to a circular geometry but may be provided in any shape suitable with system parameters. Alternative arrangements are schematically illustrated in FIGS. 2, 3, and 4. In FIG. 2, scan electrodes 34, 35 are planar in shape. In FIG. 3, electrodes 36, 37 are cylindrical in shape and can comprise, for example, a rod or wire. With an array of scanning jets similar to that depicted in FIG. 1, it is desirable to form the scan electrodes, ground shields and charge electrodes in as compact a configuration as is consistent with the jet placement density within the array.

Various combinations of parameters may be chosen to practice the present invention. A combination of parameters suitable for use in the practice of the present invention is as follows: a drop generator perturbation for drop formation of about 120 KHz; a spacing of about 3 mils between continuous stream 12 and the scan electrode; a scan electrode extending 10 mils along the stream; a charging voltage level of about 20 volts on charge electrode 24; a voltage level of about 3000 volts on drop deflection electrode 28; and a scan sweep voltage on the order of 200 volts maximum.

The motion of the paper or receiving member along the print plane 30 can be either continuous or discontinuous. Discontinuous motion can be provided by a stepping motor so that the paper remains stationary during one scan period and is moved during flyback of the continuous stream. With proper alignment of the jets, skewing of lines printed on the stepped receiving medium does not occur. However, with continuous motion of the receiving medium in the print plane, skewing will occur in the printed line due to the different times of impact of drops generated during a scan period. One method for compensating for this is by skewing the array of jets and the drop generator in a direction opposite to the direction of skew in the printed line. Another method of offsetting the printed line skew is to use a multisegmented electrode having multiple segments 40–43, as the scan electrode. Such an electrode, having four segments, is depicted in FIG. 4 as viewed from the front. The scan electrode in FIG. 4 is similar to that of FIG. 1 with the exception of having four segments rather than two segments. The heavy dot in the center of the four directions denotes the continuous stream 12 in its non-scanned or home position. The direction of deflection of the continuous stream is dependent upon the identity of the electrode segments energized and the magnitudes of the voltage levels applied to the addressed segments. By providing continuous DC bias to selected electrode segments, the continuous stream can be maintained away from its home axis in a direction effective to offset printed line skew. Each jet in an array of jets can be similarly cocked to a selective home position from which scanning is caused by application of a time varying or periodic scan signal to selected scan electrode segments.

Figure 5:
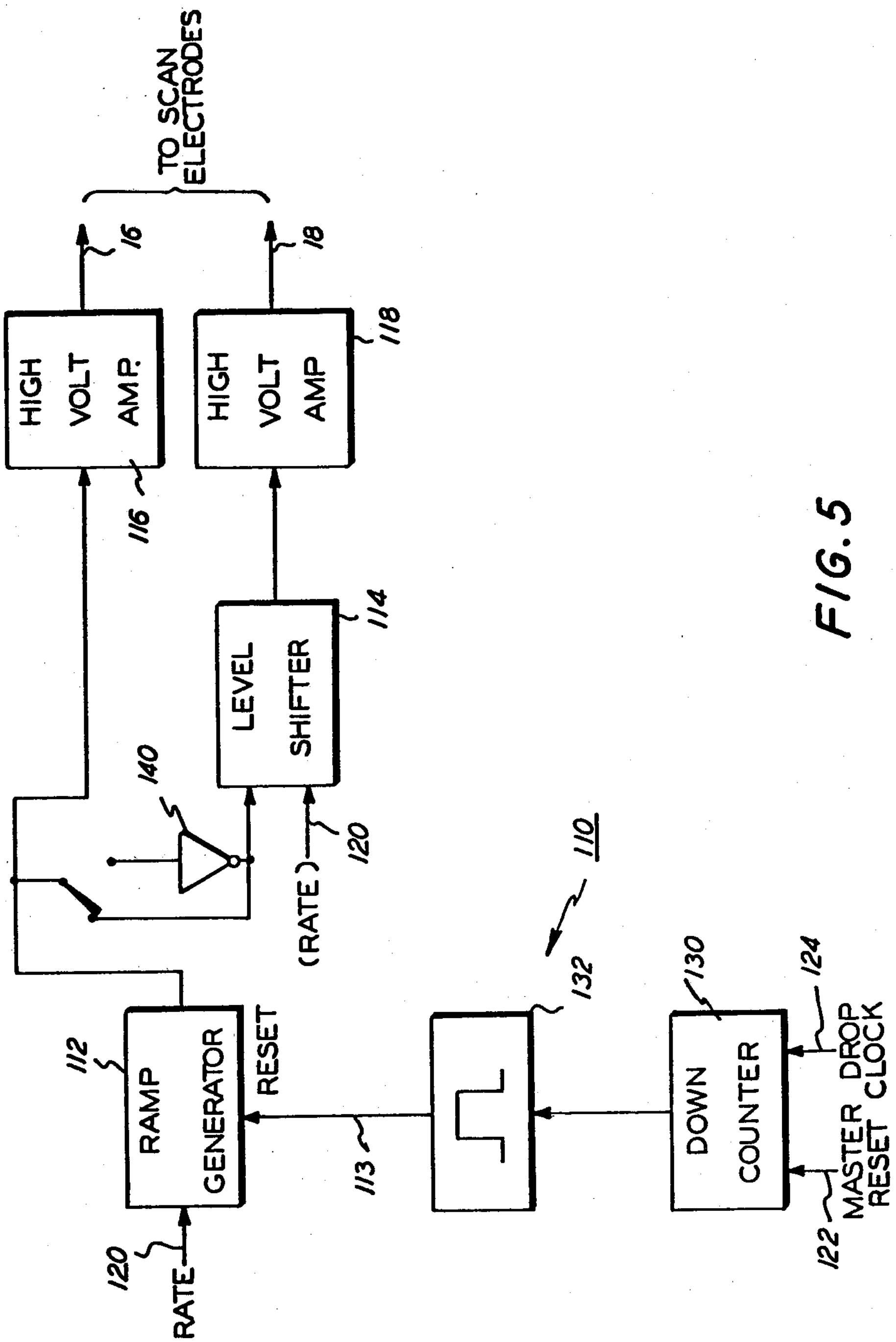
FIGS. 5–6 show circuitry for controlling scan voltages applied to the scan electrodes.
Figure 6:
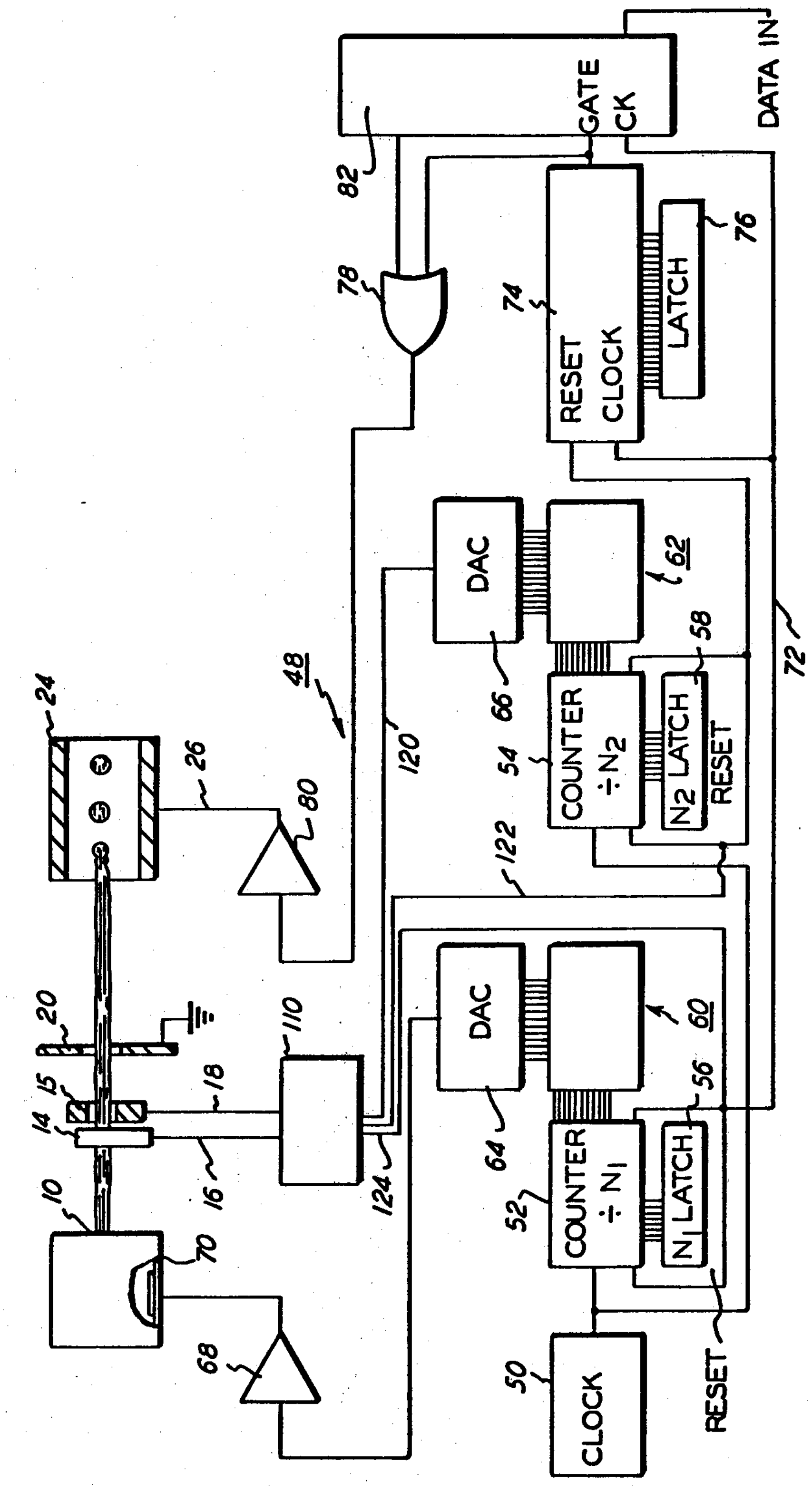

Referring now to FIGS. 5 and 6, there is schematically illustrated control circuitry for the ink jet array depicted in FIG. 1. The FIG. 6 circuitry 48 comprises a master clock 50 for clocking the system at a sufficiently high frequency $f_m$ to provide a desired degree of accuracy to the system and a desired ink throughput. A waveform from the clock 50 is coupled to first and second counters 52, 54. Connected to the two counters 52, 54 are two data latches 56, 58 which input initial count data to the counters. The counters 52, 54 are connected to two read only memories 60, 62 which generate a crystal drive and scan electode signal in digital form. The digital signals from the read only memories 60, 62 are converted to analog form in two digital to analog converters 64, 66. The analog signal from a first digital to analog converter 64 is amplified by an amplifier 68 and drives a crystal 70 at the drop generation frequency. By reference to the Pond application (Ser. No. 894,799) it is seen that thus far the circuitry 48 for controlling the ink jet is the same as the circuitry disclosed in the Pond application. In the Pond application, however, the output from the digital to analog circuit connected to the scan electrode 13 differs from the waveform generated by the present digital to analog circuit 66. The difference will be discussed with reference to FIG. 5.

The frequency at which the crystal 70 is driven is equal to the master clock frequency, $f_m$ divided by $N_1$ an interger value provided by the first counter 52. As an illustrative example, $f_m$ is given the value 9.216 k hz and $N_1$ is given the value 128 so that the crystal drive signal has a frequency $f_d$ of 72 K hz. This is the drop generation frequency.

The scan frequency is less than the drop frequency and in the illustrated embodiment the drop frequency will be a multiple of the scan frequency. The scan frequency $f_s$ is equal to the frequency $f_m$ of the master clock divided by $N_2$ where $N_2$ is equal to $N_1$ times the number of drops desired per complete scan cycle, including flyback time. As depicted in FIG. 1, during one cycle of the scan, including flyback, a total of 12 drops are produced; 9 drops during active scanning and 3 drops during flyback. Thus, in the illustrated embodiment $N_2$ is equal to 12 times $N_1$ or 1,536. This provides a scan electrode signal frequency of about 6 k hz.

A reset signal 72 is generated by the first counter 52 and clocks a shift register 74 at the drop frequency $f_d$. The shift register 74 is connected to a data latch 76 which provides a signal pattern for each scan of the continuous stream. The pattern consists of a series of "high" or "low" signals depending on whether a given drop is to strike the paper or strike the gutter 32. The shift register pattern serves as a blanking function control. A "high" level in the pattern stored in the register 74 indicates a given drop is to strike the gutter, thus, by selectively loading "high" signals into the shift register 74 selected one's of the drops in each scan are caught by the gutter 32. This blanking control is achieved by outputting a signal from the shift register 74 to an "OR" gate 78. Each time a "high" signal is gated from the register 74 the "OR" gate transmits this "high" to an amplifier 80 which generates a voltage causing the drop to be charged and therefore deflected to the gutter. It should be noted that the data from the latch 76 is gated to the shift register at a frequency equal to the scan frequency $f_s$ since the reset input to the register 74 is connected to the output from the counter 54.

The "OR" gate 78 has a second input connected to a latch circuit 82 which controls the transmission of data signals other than blanking signals. Data from a data input on the latch 82 is gated to the "OR" gate 78 at a clocking frequency equal to the drop frequency $f_d$. So long as the data output from the latch 82 to the gate 78 is "high" drops will be charged and deflected to the gutter 32. For those drops directed to the paper, the latch output is low so the electrode 26 leaves them uncharged and consequently unaffected by the deflecting electrode 28. Further information regarding the circuitry illustrated in FIG. 6 may be obtained by referring to the above referenced and incorporated Pond application.

Turning now to FIG. 5, there is illustrated a sweep circuit 110 coupled to the scan electrodes 14, 15 through the leads 16, 18 and comprising a part of the FIG. 6 circuitry. It is the scan circuit 110 which makes the column deflection directly proportional to a control voltage rather than the square of that voltage. The sweep circuit 110 comprises a ramp generator 112 coupled to two high voltage amplifiers 116, 118. One of the high voltage amplifiers 118 is connected through a level shifter 114 which provides a voltage shift of the output from the second high voltage amplifier 118 in relation to the first high voltage amplifier 116. The ramp generator 112 is a gated integrator which integrates a DC voltage input 120 to produce a linear ramp output to the high voltage amplifier 116 and level shifter 114, respectively. The ramp generator 112 includes a reset input 113 which resets the ramp generator output to 0 volts. The output from the ramp generator 112 is therefore a sawtooth waveform starting from zero having a slope controlled by the rate input 120. Since the output from the ramp generator is directly coupled to a first of the high voltage amplifiers 116, the voltage signal transmitted along the lead 16 to the electrode 14 ramps from zero volts up to a maximum desired positive voltage ($V_{max}$).

Figure 7:
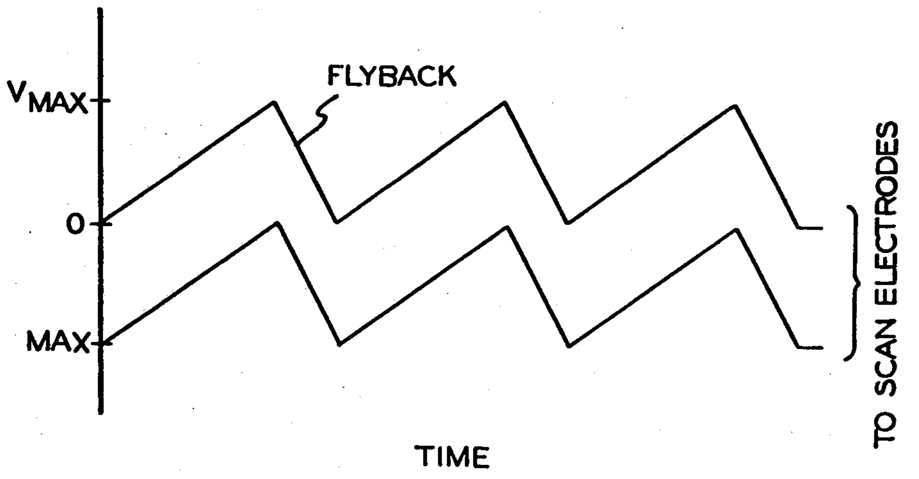
FIGS. 7–8 show alternate voltage waveforms representing the scan voltages generated by the FIG. 5 circuitry.

The output from the ramp generator also drives the level shifter 114. The level shifter substracts a constant voltage (determined by the rate input 120) from the ramp generator output. The magnitude of the constant voltage is equal to the peak value of the ramp geneator output signal. Therefore, the output from the level shifter 114 is a second sawtooth waveform identical to the ramp generator output but, starting at a value of minus V max and varying with the same slope as the ramp generator output to a value of zero volts. The second high voltage amplifier 118 amplifies this second signal and drives a second electrode 15 through a lead 18. The scan electrodes 14, 15, are accordingly driven by sawtooth waveforms separated by a constant voltage. Exemplary voltage waveforms from the circuitry are illustrated in FIG. 7.

The rationale for this circuitry and the application of a ramp waveform can be analyzed by discussing the forces acting on the column 12 in response to a voltage applied to the electrodes 13. The force, F, on a small element of the column 12 in vicinity of the deflection plates is portional to Q, the induced charge on the column, and E, the electric field strength between the plates. In prior art practice, one electode is held at ground potential while the potential on the other electrode is varied for scanning purposes. Under these circumstances both Q and E are proportional to the input voltage on the second electrode making the force proportional to the square of the voltage. The operation of prior art device was non-linear with respect to input voltages and the jet was deflected proportionally as the square of the input signal.

When an increasing ramp type voltage is applied to both electrodes, however, the deflection of the column 12 is directly proportional to the changing ramp voltage rather than proportional to the square of that voltage. This phenomena is due to the fact that the electric field strength between the electrode remains constant while the induced charge is roughly proportional to the average of the two electrode potentials. As both voltages ramp upward the voltage difference between the two remains constant and since the electric field strength is approximately equal to the difference in voltage divided by the spacing between electrodes, the electric field strength remains the same. The charge Q, however, is proportional to $$\frac{V_1 + V_2}{2}.$$

As the circuit 110 increases the voltages by an amount $\Delta V$, the induced charge Q is given by the expression $$\frac{V_1 + \Delta V + V_2 + \Delta V}{2} = \frac{V_1 + V_2}{2} + \frac{2\Delta V}{2} = Q_o + \Delta V.$$

The change in force on the incremental element is thus proportional to $\Delta V$.

The scan circuitry 110 includes three inputs 120, 122 and 124 from the circuitry illustrated in FIG. 6. These inputs, both coordinate the ramping of the high voltage outputs to the electrodes 14, 15 with ink droplet formation but also allow the circuitry illustrated in FIG. 6 to control the degree of deflection applied to the individual ink jet columns. In order to synchronize the column scan with the drop production process, the output from the counter 52 representing the drop frequency $f_d$ is fed to a down counter 130 along the input 124. The down counter 130 is preset to the number of drops contained in each scan and in the illustrated embodiment this number is 12. When the down counter 130 reaches its terminal count zero it triggers a monostable multi-vibrator 132 which resets the ramp generator 112. The counter 130 then automatically reloads the preset count and it awaits a reset signal 122 from the FIG. 6 circuitry.

As illustrated in FIG. 6, the master reset signal 122 is shown coupled to the output from the second counter 54 thereby reinitiating the downward count of the down counter 130 once for each scan signal. It should be appreciated, however, that the timing of the master reset input 122 can be modified for a particular ink jet application.

The rate input 120 is the input which determines how steeply the ramp generator output rises and also dictates the voltage separation between electrodes 14, 15 provided by the level shifter. This input 120 is a D.C. voltage generated by the second digital to analog converter 66 in response to the ROM 62. The distinction between operation of the Pond application apparatus and the present apparatus is that the Pond circuitry generates its control voltages directly in the ROM and then uses the digital to analog converter to generate a time varying scan voltage. The present ROM 62 only calculates an appropriate D.C. rate voltage for transmittal to the circuit 110. It is certainly within the scope of the invention, however, to generate two simultaneously varying voltages using the Pond technique.

A second embodiment for making the scan response of the column 12 directly proportional to input voltage requires that the electric field between the electrodes 14, 15 be increased while the induced charge on the column 12 remains constant. This embodiment requires that the scan voltages be varied continuously but that while one is increasing in magnitude, the second is decreasing so that the induced charge remains constant, or relatively so. The increase in the net voltage separation between electrodes continuously increases the electric field acting on the constant induced charge thereby producing a column deflection proportional to the changes in the electrode voltages.

The same formulations for the electric field and induced charge apply. Namely:

$$Q \alpha \frac{V'_1 + V'_2}{2},$$

but if $V'_1 = V_1 + \Delta V$ and $V'_2 = V_2 - \Delta V$, then $$Q' \alpha \frac{V_1 + \Delta V + V_2 - \Delta V}{2} = \frac{V_1 + V_2}{2}$$

so the charge is a constant. The electric field strength however is variable:

$$E' = \frac{V'_2 - V'_1}{d} = \frac{V_2 - \Delta V - V_1 - \Delta V}{d} = \frac{V_2 - V_1 - 2\Delta V}{d} = E_o - \frac{2\Delta V}{d}$$

so that the change in field strength is proportional to the changes in voltage as desired.

Figure 8:
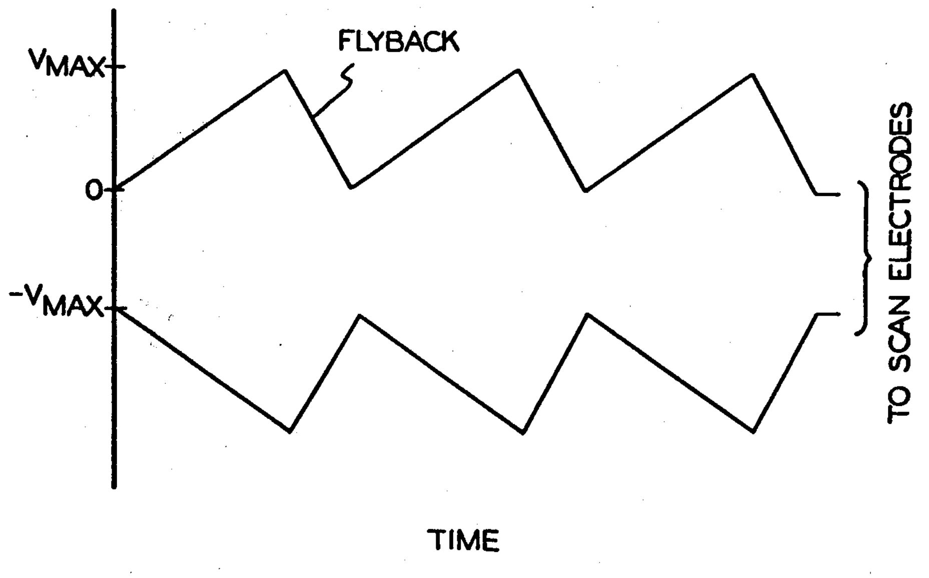

In the FIG. 5 embodiment of the scan circuitry, this second embodiment requires the insertion of an inverter 140 between the ramp generator 112 and the level shifter 114. In this embodiment the level shifter 114 insures that a net charge is induced on the column 12 and the inverter 140 insures that while the output from the first high voltage amplifier 116 is increasing the output from the second high voltage amplifier will be decreasing. In this way, the above relations representing the second embodiment are achieved. Waveforms illustrative of this second embodiment are shown in FIG. 8.

While the above discussion has described the invention with a degree of particularity, it will be appreciated by one skilled in the art that other variations and changes can be readily made in view of the previous discussion. In particular, the circuitry shown in FIG. 6 is representative of typical ink jet scanning circuit but practice of the improved scanning circuit to linearize the deflection with respect to a voltage input could utilize other functionally equivalent circuitry. It is therefore the intent that all modifications of the invention falling within the spirit and scope of the appended claims be covered.

I claim:

1. Ink drop apparatus comprising:

a drop generator for squirting at least one liquid column from a nozzle to form liquid drops at a breakoff region causing said drops to fly toward a target;

a charging electrode located at the drop breakoff region for inducing charges onto drops formed from the liquid column;

drop deflection means for deflecting charged drops;

scanning means having two electrodes positioned on opposite sides of each liquid column for sweeping the column to displace the drops formed at the breakoff region in the direction of sweep; and sweep circuit means coupled to the scanning means for applying time varying voltages simultaneously to said electrodes that make the sweep angle directly proportional to the magnitude of the applied voltages, wherein said sweep circuit means includes means for biasing the first and second electrodes with first and second constant potentials and either for adding an equal sweep voltage to both said first and second electrodes or for adding to one and subtracting an equal amount from the other of said first and second electrodes a varying sweep voltage, so that the sweep circuit either maintains the electric field strength between the two electrodes substantially constant or maintains the induced charge on the column in the vicinity of the electrodes substantially constant.

2. Ink drop apparatus for controllably directing ink to a target comprising:

a drop generator for generating a number of ink columns under pressure, said generator including means for perturbing said ink to form liquid drops at a breakoff region;

a number of charging electrodes for charging selected drops formed at the breakoff region;

means for diverting charge drops thereby allowing uncharged drops to strike said target;

deflection means including deflection electrodes positioned on opposed sides of said columns prior to drop breakoff for sweeping said columns from side to side; and control means for stitching together drops from said number of ink columns by applying time varying voltages to said electrodes having magnitudes which are linearly proportional to a desired column deflection, wherein said control means comprises circuitry for controllably changing the voltage on said opposed electrodes to maintain the electric charge on said column substantially constant while increasing or decreasing the electric field in the region of said column.

3. Ink drop apparatus for controllably directing ink to a target comprising:

a drop generator for generating a number of ink columns under pressure, said generator including means for perturbing said ink to form liquid drops at a breakoff region;

a number of charging electrodes for charging selected drops formed at the breakoff region;

means for directing charged drops thereby allowing uncharged drops to strike said target;

deflection means including deflection electrodes positioned on opposed sides of said columns prior to drop breakoff for sweeping said columns from side to side; and control means for stitching together drops from said number of ink columns by applying time varying voltages to said electrodes having magnitudes which are linearly proportional to a desired column deflection, wherein said control means comprises circuitry for controllably changing the voltage on said opposed electrodes to vary the charge on said column while maintaining the electric field substantially constant.

* * * * *